United States Patent
McLean

[11] 3,850,274
[45] Nov. 26, 1974

[54] DIFFERENTIAL LOCK-UP RESPONSIVE TO BRAKE MALFUNCTION

[75] Inventor: Douglas H. McLean, Grosse Ile, Mich.

[73] Assignee: Ford Motor Company, Dearborn, Mich.

[22] Filed: Apr. 22, 1974

[21] Appl. No.: 463,082

[52] U.S. Cl................ 192/4 A, 74/710.5, 180/82 A
[51] Int. Cl............................................. B60k 29/02
[58] Field of Search.......... 192/4 A, 13 R; 74/710.5; 180/82 A

[56] References Cited
UNITED STATES PATENTS

| | | | |
|---|---|---|---|
| 2,140,780 | 12/1938 | Wimmer | 192/4 A |
| 3,439,785 | 4/1969 | Hughson | 192/4 A |
| 3,446,320 | 5/1969 | Schott | 192/4 A |
| 3,498,427 | 3/1970 | Bingley | 192/4 A X |

Primary Examiner—Benjamin W. Wyche
Attorney, Agent, or Firm—William E. Johnson; Keith L. Zerschling

[57] ABSTRACT

A brake device for a vehicle having first and second brakable wheels is disclosed. The brakable wheels have first and second axles connected thereto. The brake device includes dual master brake cylinders with first and second hydraulic lines connecting respective ones of these cylinders to brake cylinders associated with the first and the second wheels. A hydraulic differential lock clutch is provided in the system. This clutch has a supply port through which hydraulic pressure may be applied to operate the differential clutch from an unactuated condition in which the axles of the wheels are freely rotatably relative to each other, to an actuated condition in which the two axles are locked together so that they rotate as a unit. A hydraulic shuttle valve having a pair of terminal ports and a central port is also provided. The shuttle of the valve assumes a neutral position which closes the central port when balancing pressures are applied to different surfaces thereof through the pair of terminal ports. A third hydraulic line connects the first hydraulic brake line to one of the terminal ports of the hydraulic shuttle valve while a fourth hydraulic line connects the second hydraulic brake line to the other terminal port of the hydraulic shuttle valve. A fifth hydraulic line connects the central port of the hydraulic shuttle valve to the supply port of the hydraulic differential lock clutch. When the pressure is lost in either the first or the second hydraulic brake lines, the shuttle valve is actuated to interconnect the hydraulic line having full pressure therein with the differential lock clutch. This action operates the lock clutch so that the first and the second axles are locked together and a straight line braking of the vehicle occurs although braking pressure is applied to the brakes of only the one wheel which has full pressure in its brake line.

5 Claims, 2 Drawing Figures

PATENTED NOV 26 1974　　　　　　　　3,850,274

DIFFERENTIAL LOCK-UP RESPONSIVE TO BRAKE MALFUNCTION

BACKGROUND OF THE INVENTION

In recent years, many motor vehicles have been equipped with dual master brake cylinders. The purpose of using such dual cylinders is that one cylinder will provide the braking pressure to one set of wheels of the vehicle while the other cylinder will apply the braking pressure to the remaining set of wheels of the vehicle. If one or the other of the dual master cylinders or brake lines associated therewith has a hydrualic failure, the vehicle may still be stopped.

Dual master cylinders are also used on tractors. A tractor, however, generally has only one set of brakable wheels, that is the rear drive wheels. When a failure occurs in the hydraulic brake system for a tractor, only the brakes on one side of the vehicle are applied. This action may cause the tractor to pivot about the braked wheel. If the braking is too rapid the tractor may be turned violently to one side or the other.

It is an object of this invention to provide a brake device for a vehicle which provides straight line braking for the vehicle. It is another object of this invention to provide a brake device for a vehicle which may have only one set of brakable wheels but which also has a locking differential. It is a still further object of this invention to provide a brake device for a tractor which has first and second brakable wheels on opposite sides thereof and which has a device for locking up the axles to each of the wheels for rotation with one another.

SUMMARY OF THE INVENTION

This invention relates to a brake device for a vehicle and, more particularly, to a brake device for a vehicle having first and second brakable wheels on opposite sides of the vehicle with first and second axles being connected to respective ones of the wheels.

In accordance with the teachings of this invention, the brake device includes dual master brake cylinders. A first hydraulic line connects one of the master brake cylinders to a first wheel brake cylinder associated with the brakes of the first wheel. The one master cylinder, the first hydraulic line and the first wheel brake define a first hydraulic brake system. A second hydrualic line connects the other master brake cylinder to a second wheel brake cylinder associated with the brake of the second wheel. The other master cylinder, the second hydraulic line and the second wheel brake cylinder define a second hydraulic brake system.

A hydraulically operated differential lock clutch is provided which has a supply port through which hydraulic fluid may be applied to the differential clutch for operation thereof. The differential clutch is operated from an unactuated condition in which the axles to each of the wheels are freely rotatably relative to each other to an actuated condition in which the two axles are located together so that they rotate as a unit.

A hydraulic shuttle valve is provided. This valve has a pair of terminal ports and a central port. Ths shuttle of the valve assumes a neutral position which closes the central port when balancing pressures are applied to different surfaces thereof through the pair of terminal ports.

A third hydraulic line connects at least a portion of the first hydraulic brake system to one terminal port of the hydraulic shuttle valve. The fourth hydraulic line connects a portion of the second hydraulic brake system to the other terminal port of the hydraulic shuttle valve. A fifth hydraulic line connects the central port of the hydraulic shuttle valve to the supply port of the hydraulically operated differential lock clutch.

When pressure is lost in either the first or the second hydraulic brake systems, the shuttle valve is actuated to interconnect the hydraulic brake system having full pressure with the differential lock clutch. This interconnection causes the differential lock clutch to operate so that the first and the second axles are locked together. The locking of the axles together causes a straight line braking of the vehicle although braking pressure is applied to the brakes of only the one wheel which has full pressure in its brake system.

If the brakes of the vehicle are independently operable, additional structure is provided in the brake system.

DESCRIPTION OF THE PREFERRED EMBODIMENT

Construction

Figure 1:
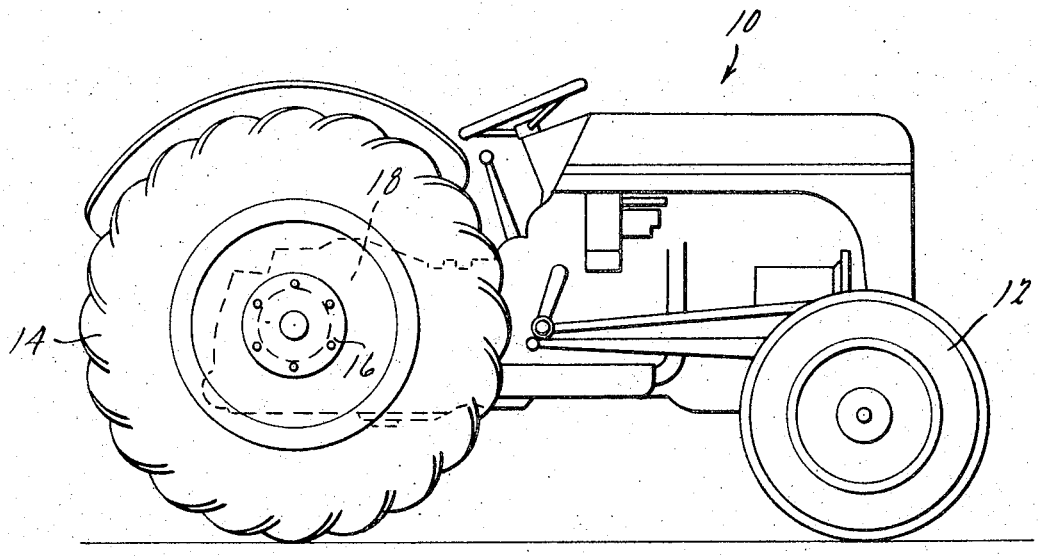
FIG. 1 is a side elevation view of a tractor vehicle.

In FIG. 1 there is seen a vehicle, in this case a tractor, generally identified by the numeral 10. The tractor has a pair of front wheels 12, only one shown, and a pair of rear wheels 14, only one shown. A pair of axles 16, only one shown, connect the pair of rear wheels to an end housing 18 of the tractor. The end housing contains a hydraulic differential lock clutch, generally identified by the numeral 20 in FIG. 2. The clutch contains a plurality of clutch elements 22 which are operated by prodiving hydraulic fluid through a supply port 24. When in an unactuated condition, the lock clutch permits the axles 16 to rotate relative to one another. However, when sufficient hydraulic pressure is supplied through the supply port to the clutch elements of the lock clutch, the pair of axles are locked together for rotation in a known manner. Most tractors are provided with a locking differential system for the rear axles.

Figure 2:
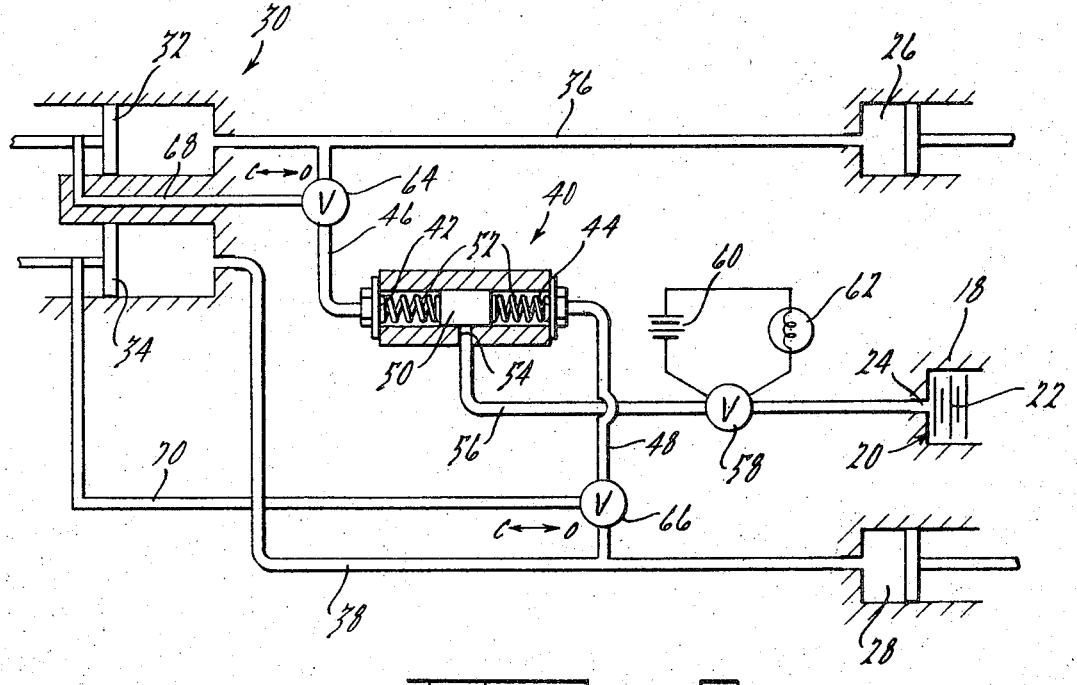
FIG. 2 is a diagrammatic view of the brake device of this invention.

Brakes are provided on both the right rear and left rear wheels 14. The brakes are of standard construction and are not illustrated in the figures. In FIG. 2, however, a right brake cylinger 26 and a left brake cylinder 28 are illustrated. when pressure is applied to either one of the brake cylinders, the brakes on the associated wheel are operated in order to slow them down. All of this braking is known.

In FIG. 2 a master brake cylinder is generally identified by the numeral 30. The master brake cylinder has a right master brake cylinder 32 and a left master brake cylinder 34. As is well known in the tractor art, the right and left master brake cylinders may be independently operated to aid in steering of the tractor 10. However, the two brakes may be operated in unison in order to effect a straight line braking of the tractor. The right master brake cylinder is connected to the right brake cylinder 26 by means of a first hydraulic line 36. The left master brake cylinder is connected to the left brake cylinder 28 by means of a second hydraulic line 38.

A hydraulic shuttle valve is provided which is generally identified by the numeral 40. The valve has a first terminal port 42 and a second terminal port 44. The first terminal port is connected by a third hydraulic line 46 to a portion of the first hydraulic line 36. The second terminal port is connected by a fourth hydraulic line 48 to a portion of the second hydraulic line 38. The hydraulic shuttle valve also has a shuttle 50. This shuttle is positioned by a pair of springs 52—52 normally in a central position which closes a central port 54. The central port is connected by a fifth hydraulic line 56 to the supply port 24 of the hydraulic differential lock clutch 20. A sensing device 58 is located in the fifth hydraulic line. This sensing device is actuated by an increase in pressure in the fifth hydraulic line to close normally open electrical contacts thereof, not shown. The closure of the contacts connects a power source 60 with an indicator light 62 which may be mounted on the console of the tractor. Lighting of the lihgt indicateds to the operator that a malfunction has occurred in the braking system.

There is also shown in the schematic diagram of FIG. 2 a first on-off valve 64 located in the third hydraulic line 46 and a second on-off valve 66 located in the fourth hydraulic line 48. These on-off valves are utilized only when the brake system of this invention is used in conjunction with a vehicle having a pair of independently breakable wheels, as for example the tractor 10. It is desirable in such a vehicle to use the brakes to the right and the left wheel independently to aid in maneuver the tractor. The first on-off valve 64 is linked to the piston of the right master cylinder 32 by means of coupling structure 68. Similarly, the piston of left master brake cylinder 34 is linked to the second on-off valve by coupling structure 70.

Operation

The brake device of this device operates in the following manner. When braking pressure is applied to the dual master cylinder 30, both the right master brake cylinder 32 and the left master brake cylinder 34 are operated to supply hydraulic fluid under pressure respectively to right brake cylinder 26 and left brake cylinder 28 via the first hydraulic line 36 and the second hydraulic line 38. With application of pressure on the respective brake cylinders, braking action occurs at the rear wheels 14 to bring the vehicle 10 to a stop. Under normal braking conditions, the third hydraulic line 46 and the fourth hydraulic line 48 each send an equal amount of brake pressure through terminal ports 42 and 44 to the shuttle 50 to maintain it in its central position keeping the central port 54 closed. By such a balance action, no increased pressure is applied on the fifth hydraulic line 56.

The springs 52—52 are designed to balance the shuttle 50 in just about it central position during normal operation. If the device of this invention is applied to a vehicle having a four wheel braking system where each set of brakes is operated by application of pressure to a single pedal, it would not need the first and the second on-off valves 64 and 66 as well as a coupling structure 68 and 70. If the structure, however, is employed with a vehicle such as a tractor wherein right and left wheels are independently brakable, this additional structure is necessary to make the device operative. As is well known, tractor operators sometimes steer their tractor by braking either the right or the left rear wheels of the vehicle. If only the right or the left wheel is braked, then only the right master brake cylinder 32 or the left master brake cylinder 34 is operated. Operation of the cylinder opens its associated on-off valve, but with the other on-off valve closed, no shifting of the shuttle 50 takes place. However, at such times as both brakes are applied simultaneously, operation of the right master brake cylinder and the left master brake cylinder, would through the coupling structures 68 and 70, operate the first and the second on-off valves to open the both of them thereby rendering the brake system of this invention effective as described below.

If a massive failure occurs in either the right or the left brake system, as for example a leak in any of the master brake cylinder, the brake line or the wheel brake cylinder, the normal resistant pressure in the hydraulic system to that wheel will be substantially reduced or entirely lost. For example, if the second hydraulic line 38 had an opening therein allowing brake fluid to leak from the brake system for the left rear wheel, the pressure applied on the right master brake cylinder 32 would be applied to the shuttle 50 through the third hydraulic line 46. The application of such pressure through the terminal port 42 of the hydraulic shuttle valve 40 would cause a shifting of the shuttle 50 to the right as viewed in FIG. 2 thereby opening the central port 54. The pressure in the brake system to the right wheel would then be applied through the central port, through the fifth hydraulic line 56, to the clutch elements 22 of the hydraulic differential clutch 20. Application of such pressure would cause a locking up of the axle 16 to both rear wheels so that the axles would rotate as a single unit. Thus the application of braking pressure to the right wheel would cause a straight line braking of the vehicle because both axles rotate as a single unit and the braking pressure applied only at the right wheel would also be felt at the left wheel through the interconnected axles. Pressurization of the fifth hydraulic line would also operate the sensing device 58 energizing the light 62 through the power source 60. The tractor operator would then be warned that a failure has occurred in one of his braking systems.

If the brake system to the right rear wheel fails, the shuttle 50 of the hydraulic shuttle valve 40 would be shifted to the left as viewed in FIG. 2 and the pressurization in the left brake system would be applied via the fourth hydraulic line, the terminal port 44 and the central port 54 to the fifth hydraulic line 56 to once again cause operation of the hydraulically operated differential clutch 20.

There has been disclosed herein a brake device for a vehicle. Those skilled in the art in view of the teachings of this specification will be able to fabricate modifications of this invention which fall within the true spirit and scope hereof. It is intended that all such modifications be included within the scope of the appended claims.

I claim:

1. A brake device for a vehicle having first and second brakable wheels on opposite sides of the vehicle with first and second axles being connected to respective ones of the wheels, which brake device comprises:

dual master brake cylinders;

first hydraulic line means for connecting one of the master brake cylinders to a first wheel brake cylinder associated with the brakes of the first wheel, these elements defining a first hydraulic brake system;

second hydraulic line means for connecting the other master brake cylinder to a second wheel brake cylinder associated with the brakes of the second wheel, these elements defining a second hydraulic brake system;

a hydraulically actuated differential lock clutch having a supply port through which hydraulic fluid is applied to the differential clutch for operation thereof from an unactuated condition in which the axles to each of the wheels are freely rotatable relative to each other, to an actuated condition in which the two axles are locked together so that they rotate as a unit;

a hydraulic shuttle valve having a pair of terminal ports and a central port, the shuttle of the valve assuming a neutral position which closes the central port when balancing pressures are applied to different surfaces thereof through the pair of terminal ports;

third hydraulic line means for connecting at least a portion of the first hydraulic brake system to one terminal port of the hydraulic shuttle valve;

fourth hydraulic line means for connecting at least a portion of the second hydraulic brake system to the other terminal port of the hydraulic shuttle valve, and fifth hydraulic line means for connecting the central port of the hydraulic shuttle valve to the supply port of the hydraulic differential lock clutch;

whereby when pressure is lost in either the first or the second hydraulic brake systems, the shuttle valve is actuated to interconnect the hydraulic brake system having full pressure with the differential lock clutch so that the clutch is operated and the first and the second axles are locked together and a straight line braking of the vehicle occurs although braking pressure is applied to the brakes of only the one wheel which has full pressure in its brake system.

2. The brake device of claim 1 further comprising: means for sensing the interconnection of either the first or the second hydraulic brake system with the differential lock clutch; and indicator means actuated by the sensing means for indicating to the vehicle operator that the differential lock clutch has been operated by interconnection therewith of either of the hydraulic brake systems.

3. A brake device for a vehicle having first and second independently brakable wheels on opposite sides of the vehicle with first and second axles being connected to the respective wheels, which device comprises:

dual master brake cylinders;

a first hydraulic line connecting one of the master brake cylinders to a first wheel brake cylinder associated with the brakes of the first wheel;

a second hydraulic line connecting the other master brake cylinder to a second wheel brake cylinder associated with the brakes of the second wheel;

a hydraulically activated differential lock clutch having a supply port through which hydraulic fluid is applied to the differential clutch for operation thereof from an unactuated condition in which the axles to each of the wheels are freely rotatable relative to one another, to an actuated condition in which the two axles are locked together so that they rotate as a unit;

a hydraulic shuttle valve having a pair of terminal ports and central port, the shuttle of the valve assuming a neutral position which closes the central port when balancing pressures are applied to differential surfaces thereof through the pair of terminal ports;

a third hydraulic line connecting the first hydraulic line to one terminal port of the hydraulic shuttle valve;

a first on-off valve located in the third hydraulic line;

first interconnecting means coupling the one master cylinder to the first on-off valve for operating the first valve to its on position when the one master cylinder is operated;

a fourth hydraulic line connecting the second hydraulic line to the other terminal port of the hydraulic shuttle valve, a second on-off valve located in the fourth hydraulic line;

second interconnecting means coupling the other master cylinder to the second on-off valve for operating the second valve to its on position when the other master cylinder is operated; and a fifth hydraulic line connecting the central port of the hydraulic shuttle valve to the supply port of the hydraulic differential lock clutch;

whereby when pressure is lost in either the first or the second hydraulic line, the shuttle valve is actuated to interconnect either the first or the second hydraulic line with the differential lock clutch so that the clutch elements thereof are operated and the clutch is actuated so that the first and the second axles are locked together and a straight line braking of the vehicle occurs although braking pressure is applied to the brakes of only the one wheel which has full pressure in its hydraulic line.

4. The brake device of claim 3 further comprising: means for sensing the interconnection of either the first or the second hydraulic line with the differential lock clutch, and indicator means actuated by the sensing means for indicating to the vehicle operator that the differential lock clutch has been operated by interconnection therewith of either the first or the second hydraulic line.

5. The brake device of claim 3 wherein: the terminal ports of the shuttle valve are on opposite ends thereof, and wherein the shuttle of the valve is spring biased to its normal position closing off the central port.

* * * * *